United States Patent [19]
Gebert et al.

[11] 3,915,984
[45] Oct. 28, 1975

[54] N-PHENYL-CARBAMIC ACID-[IMIDAZOLYL-(1)-METHYL] ESTERS

[75] Inventors: Ulrich Gebert, Kelkheim; Milos Babej, Frankfurt am Main; Ernold Granzer, Kelkheim; all of Germany

[73] Assignee: Hoechst Aktiengesellschaft, Frankfurt am Main, Germany

[22] Filed: Dec. 7, 1973

[21] Appl. No.: 422,861

[30] Foreign Application Priority Data
Dec. 9, 1972   Germany............................ 2260327

[52] U.S. Cl......... 260/309.2; 260/309; 260/453 AR; 260/453 PH; 260/544 C; 424/273
[51] Int. Cl.²...................................... C07D 235/06
[58] Field of Search........................ 260/309, 309.2

[56] References Cited
UNITED STATES PATENTS

| | | | |
|---|---|---|---|
| 3,696,116 | 10/1972 | Jeanmart et al. .................. | 260/309 |
| 3,761,491 | 9/1973 | Carlson et al. ..................... | 260/309 |

OTHER PUBLICATIONS
C.A., 63: 13,274g, (1965), Sawa

*Primary Examiner*—Sherman D. Winters
*Attorney, Agent, or Firm*—Curtis, Morris & Safford

[57] ABSTRACT

Compounds of the formula

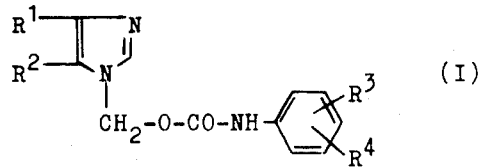

in which $R^1$ and $R^2$ each stands for a hydrogen atom or together they stand for the group —CH=CH—CH=CH— which may carry one or more lower alkyl, halogeno-alkyl or alkoxy groups, halogen atoms or $NO_2$-groups, and $R^3$ and $R^4$, independently of one another, each stands for a hydrogen atom, a lower alkyl, halogeno-alkyl, alkoxy or halogeno-alkoxy group, a halogen atom or $NO_2$ or together they stand as a —CH=CH—CH=CH— group with the benzene nucleus for the naphthyl group, and physiologically acceptable acid addition salts thereof, process for preparing them and pharmaceutical compositions containing them as active substance.

18 Claims, No Drawings

N-PHENYL-CARBAMIC ACID-[IMIDAZOLYL-(1)-METHYL] ESTERS

The present invention relates to novel carbamic acid esters and to a process for their manufacture, as well as to the physiologically acceptable acid addition salts of the carbamates.

The novel compounds correspond to the general formula I

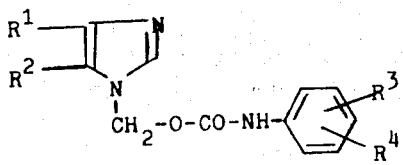

in which $R^1$ and $R^2$ each stands for a hydrogen atom or together they stand for the group —CH=λ CH—CH=CH— which may carry one or more lower alkyl, halogeno-alkyl or alkoxy groups, halogen atoms or $NO_2$-groups, and $R^3$ and $R^4$, independently of one another, each stands for a hydrogen atom, a lower alkyl, halogeno-alkyl, alkoxy or halogeno-alkoxy group, a halogen atom or $NO_2$ or they stand together as the —CH=CH—CH=CH— group with the benzene nucleus for the naphthyl group.

The novel compounds have valuable pharmacological properties and may therefore be used as medicaments.

Lower alkyl, halogeno-alkyl, alkoxy and halogeno-alkoxy are always meant to stand for radicals having 1 to 4 carbon atoms in a straight or branched chain. The radicals of $R^1$ to $R^4$ containing alkyl groups are preferably the methyl, halogenomethyl and methoxy groups.

This invention moreover provides a process for the manufacture of the compounds of formula I, which comprises introducing a hydroxy-methyl group in 1-position into an imidazole or benzimidazole of the formula II

in which $R^1$ and $R^2$ are defined as in formula I, by a reaction with formaldehyde or a substance yielding formaldehyde and reacting the methylol compound obtained which corresponds to the formula III

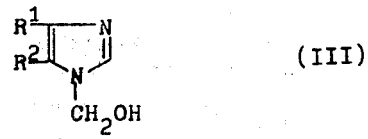

a. with an isocyanate of the formula IV

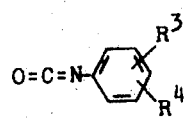

or b. with a carbamic acid halide of the formula V

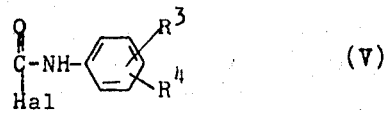

in which Hal stands for halogen, preferably chlorine or bromine, and, where required, converting the so-obtained hydrohalide into the free base according to the known methods.

The hydroxy-methylation reaction of the compounds of formula II may be carried out using formaldehyde, preferably in an aqueous solution as formaline, or advantageously a substance yielding formaldehyde, such as trioxan and especially paraformaldehyde, the hydroxy-methylating agent being advantageously used in a slight excess amount (of up to about 10%). The reaction may be performed in a solvent or preferably by melting the imidazole of formula II with paraformaldehyde at a temperature of from 50° to 120°C, an addition of catalytic amounts (preferably from 0.1 to 2% by weight, calculated on the imidazole) of a basic substance, such as an alkali metal hydroxide or a tertiary amine, especially triethylamine, though not necessary, appreciably promotes the reaction especially in the benzimidazole series. It is possible but not necessary to isolate the methylol compounds of formula III in known manner, preferably by dissolving the limpid melt, where required after having it cooled, in an inert solvent, for example chloroform or methylene chloride, and then reacting the solution with an isocyanate of formula IV method (a) or with a carbamic acid halide of formula V method (b). The reaction with the isocyanate according to method (a) is preferred for technical and economical reasons and is carried out by adding the isocyanate of formula IV, where required diluted with an inert solvent, to a solution of the methylol compound of formula III, which has preferably been prepared freshly, whereupon reaction starts with heating. The reaction mixture is then heated to 40°–65°C for a short time (15 to 30 minutes) and the precipitated product is isolated.

Some of the isocyanates of formula IV are trade products or, if not, they are easily obtainable by phosgenation of the corresponding anilines according to methods known in the art (cf. inter alia, Houben-Weyl, Methoden d. org. Chemie, vol. VIII, page 120).

When, according to method (b), carbamic acid halides of formula V are used in known manner instead of isocyanates of formula IV, the reaction proceeds as follows: First, the carbamic acid chloride is prepared by slowly adding, to a solution of phosgene in an inert solvent, such as benzene or tetrahydrofuran, twice the stoichiometrical amount of an aniline or naphthylamine of formula VI

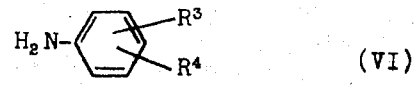

in which $R^3$ and $R^4$ are defined as above, where required in an inert solvent or diluent, at a temperature of from −10° to +25°C. The precipitating amine hydrochloride is separated, a freshly prepared solution of the methylol compound of formula III is added to the filtrate in a stoichiometrical amount and the exothermic reaction is discontinued by refluxing for a short time. The solvent is removed in vacuo and the residue obtained is the desired product in the form of its hydrochloride, from which the base may be set free in the usual manner by dissolving it in water and precipitating the product with a dilute sodium hydroxide solution.

Physiologically acceptable acid additions salts are prepared from the carbamates of formula I in known manner, suitable acids for this purpose being both inorganic and organic acids, for example hydrochloric acid, hydrobromic acid, sulfuric acid, phosphoric acid, methane-sulfonic acid, p-toluene-sulfonic acid, acetic acid, lactic acid, succinic acid, tartaric acid and maleic acid.

The compounds of formula I are distinguished by interesting pharmacological properties. In addition to an appreciable influence on the lipid level of the blood serum, the compounds of the imidazole series especially have an anti-inflammatory, analgesic, antipyretic and anorexigenic activity. Some substances of this class also show a substantial sedative effect and intensify and prolong the narcotic effect of barbiturates.

This invention finally provides medicaments which contain an effective amount of a compound of formula I as an active substance in admixture with the usual carriers and diluents.

Hypolipemic activity

Having a relatively low acute toxicity (see $LD_{50}$-values in Table I, column 1), the novel carbamic acid esters of formula I are able substantially to lower the serum triglyceride level in normolipemic male rats (see Table I). Moreover, they show an excellent inhibiting effect both on the formation of hypercholesteremia to be initiated by dieteticmedicamentous methods (see Table II) and on the rise of hypertriglyceridemia induced by carbohydrates (see Table III).

Tests on animals as hereinafter disclosed clearly demonstrated a substantial superiority of the compounds of formula I over the known clofibrate serving as a comparative substance.

1. Standart test on male rats having a normal serum lipid content

The test period covered 8 days. The substances were orally administered once a day by means of an esophagal sound in doses of 100, 30, 10 and 3 mg/kg of body weight each. Generally, blood was taken prior to and after the treatment and the concentration of triglycerides in the serum was determined according to the method of Eggstein and Kreutz. The values calculated from these measured data of the lowering of the serum triglyceride content are compiled in Table I.

Moreover, even at a dosage of 10 mg/kg/day, at which clofibrate does not show an effect any more, the compositions A, L and M still substantially reduce even the cholesterol content in the serum of normolipemic rats (compound A: −20%, L: −15 % and M: −31 %).

2. Dietetic-medicamentous hypercholesteremia of male rats

A feeding agent containing 2 % of cholesterol, 2 % of sodium cholate, 0.3 % of methyl thiouracil, 20 % of coco fat (Palmin (R)) and 44 % of cane sugar was used as a diet to increase the serum cholesterol level in male rats to about 10 times its initial value within 1 week. At the same time as the diet was offered, 10 and 3 mg/kg, respectively, of the compounds cited in Table II were administered once a day by means of an esophagal sound to the animals of the treated group (comprising 10 animals each). After 8 days, the average concentration of the serum cholesterol was determined and compared to that of the control group on diet (= 100 %), the food consumption being almost the same.

3. Hypertriglyceridemia induced by carbohydrates in male rats

Investigations were being made on the influence which a 3-day oral pretreatment with the compounds cited in Table III had on the formation of hypertriglyceridemia induced by fructose doses in male rats in comparison with a group treated with placebo doses ( = 100 %).

TABLE I

Hypoglyceridemic activity

| Composition ($LD_{50}=$ in g/kg) | Change in percentage of the serum triglyceride content in the standard test after oral administration of 8 doses in mg/kg/day | | | |
|---|---|---|---|---|
| | 100 | 30 | 10 | 3 |
| IA (2.9) | −82/−74 | | /−35 | −8/ |
| B (> 4) | −69/−61 | −18/−29 | | −6/ |
| C (> 4) | −41/−52 | | | |
| D (1.5) | −59/−39 | −11/ | | |
| E (1.5) | −77/−77 | | −41/−24 | −36/ |
| G (4.4) | −43/−10 | −28/ −8 | | |
| H (1.2) | −55/−43 | −20/−15 | | |
| I (3.5) | −35/−40 | | | −25/ |
| K (> 8) | −51/−57 | | | |
| L (> 8) | −19/−44 | | | |
| M (> 8) | −13/−37 | | /−33 | |
| Clofibrate | −30/−30 | −4/ −7 | not effective | not effective |

*) established on mice after oral administration
The figures cited first are to express the change in percentage of the final value (value after treatment), calculated on the initial value (value prior to treatment = 100 %) of the treated group; the figures cited in the second place are to indicate the change in percentage of the final value of the treated group, referred to the final value (= 100 %) of an accompanying untreated (placebo) group.

TABLE II

Inhibition of dietetic-medicamentous hypercholesteremia

| Composition | dose in mg/kg/day | change in percentage of the serum cholesterol content after 8 days. |
|---|---|---|
| A | 10 | −47 |
| | 3 | −34 |
| B | 10 | −13 |
| D | 10 | −12 |
| E | 10 | −33 |
| | 3 | −31 |
| F | 10 | −22 |
| I | 10 | −18 |
| Clofibrate | 100 | +2 |
| | 10 | +11 |

TABLE III

Inhibition of carbohydrate-induced hyperglyceridemia

| Composition | change in percentage of serum triglyceride content after oral administration of 3 doses in mg/kg/day | | |
|---|---|---|---|
| | 100 | 30 | 10 |
| A* | | −29 | |
| B | −78 | −26 | −11 |
| C | −76 | −53 | −44 |
| D | −65 | | |
| E | −81 | −44 | |
| H | −79 | | |

TABLE III-Continued

Inhibition of carbohydrate-induced hyperglyceridemia

| Composition | change in percentage of serum triglyceride content after oral administration of 3 doses in mg/kg/day | | |
|---|---|---|---|
| | 100 | 30 | 10 |
| Clofibrate | −38 | −8 | not effective |

*At a dose of 30 mg/kg/day the serum cholesterol-lowering rate was −40% and at a dose of 10 mg/kg/day it was −34%.

Antiphlogistic properties

The antiphlogistic activity of the novel compounds was determined according to the following methods, phenyl-butazone serving as a comparative compound.

1. Claw edema test on white rats

Feeding of a group comprising 5 to 6 Sprague-Dawley rats was interrupted in the afternoon prior to the day of the test. 30 Minutes after the test substance had been administered per os, Aerosil was injected subplantarly as an irritating agent into the claws of the animals which had been anesthetized with ether. The claw size was measured according to the method disclosed by Lence (cf. Arch. int. Pharmacodyn. 136, page 237 (1962)) immediately upon administration of the irritating agent and further after 3, 6, 8 and, where required, even after 24 hours. The values found for the absolute increase in swelling were used to calculate the $ED_{50}$, i.e., the dose required for reducing the edema volume of the placebo group to 50 percent.

TABLE IV $Ed_{50}$-values in the claw edema test on rats

| Composition | $ED_{50}$ (mg/kg, p.o.) | Composition | $ED_{50}$ (mg/kg, p.o.) |
|---|---|---|---|
| A | 130 | F | 100 |
| B | 150 | G | 150 |
| C | 160 | H | 160 |
| D | 150 | I | 160 |
| E | 40 | phenyl-butazone | 30 – 80 |

2. Cotton wool granuloma test on rats

The test was performed substantially according to the test arrangement disclosed by MEIER et al. in Experienta 6, p. 469 (1950). After small cotton wool balls had been implanted in the coccygeal area, 10, 30 and 100 mg/kg of the compound E, enveloped in starch mucilage as a carrier, were administered once a day to the 10 animals of the treated group by means of an esophagal sound over a period of 7 days. On the 8th day, the animals were killed and the granuloma were removed, dried until their weight remained constant and the dry weights were compared to those of the placebo group and of the group treated with the standard composition:

| Composition | $ED_{50}$ in mg/kg, p.o. |
|---|---|
| E | 100 |
| phenyl-butazone | 110 |

3. Granuloma pouch test on rats

With the aid of the method of A. BORIS et al., Arch. int. Pharmacodyn. 153, page 205 (1965), the influence of the composition C on the amount of exudate caused by the granuloma which has been induced by carrageenin in Sprague-Dawley rats was examined. The compositions were administered per os once a day over a period of 4 subsequent days in doses of 16, 40 and 100 mg/kg (8 animals per dose). The animals were then killed, the average exudate amount was determined and compared to that of the placebo group:

| Composition | $ED_{50}$ in mg/kg, p.o. |
|---|---|
| C | 100 |
| phenyl-butazone | 80 |

Analgesic activity

Evidence of the analgesic activity was brought using the phenyl-quinone writhing test on mice as disclosed by Siegmund et al., Proc. Soc. exp. Biol. Med. 95, p. 729 (1957) and Hendershot et al., J. Pharmacol. exper. Ther. 125, p. 237 (1959). The compounds were enveloped in starch mucilage and orally administered in dosage units of from 40 to 200 mg/kg. The test criterion was the number of typical writhings shown within the first 15 minutes after intraperitoneal administration of the irritating agent, against which only those animals were considered to be protected which performed 50 % or less writhings, referred to the mean value of the placebo group (cf. H. Blumberg et al., Proc. Soc. exp. Biol. Med. 118, p. 763 (1965)). This number was taken to determine the percentage of protected animals in the treated group and to calculate the $ED_{50}$-value according to Lichtfield and Wilcoxon.

| Composition | $ED_{50}$ in mg/kg, p.o. |
|---|---|
| A | 25 – 50 |
| C | 80 |
| phenacetine | 80 |

Antipyretic activity

The test for the fever-lowering activity was made on rats (5 animals per dose) whose body temperature was raised by a subcutaneous injection of a 15 % beer yeast suspension 6 hours prior to the oral administration of the test substance enveloped in starch mucilage (see Table V).

Sedative effect

Psychopharmacological examinations demonstrated that the compounds compiled in Table VI and administered orally to mice of the NMRI strain substantially reduce the motor activity upon a treatment with 1-phenyl-2-methylamino-propane hydrochloride and some of them appreciably intensify anesthesia caused by hexobarbitals.

For the determination of the catecholamine antagonism (L. Ther, Dtsche. Apotheker-Zeitung 1953, p. 292) 0.5 mg/kg of 1-phenyl-2-methylamino-propane hydrochloride were subcutaneously administered to the animals 15 minutes after administration of the compositions and after another 15 minutes the test was started by checking, over a period of 1 hour at time intervals of 1 minute, the number of animals which were moving at just that moment of checking. The test was evaluated by adding these measured values and comparing the sum found to that of a placebo group (= 100 %).

The influence on the duration of sleep upon a subcutaneous administration of 140 mg/kg of a hexobarbitural was tested on mice, to which 20 mg/kg of each substance to be tested had been orally administered 30 minutes before. A comparison of the mean anesthesia period observed to that of a placebo group (= 100 %) allowed the prolongation of sleep to be calculated in percentage (see Table VI).

The carbamic acid esters of formula I or their salts may be used either as such or in admixture or conjunction with pharmacologically acceptable carriers, an oral dosage unit form being preferably administered. As pharmacologically acceptable carriers, there are preferably mentioned magnesium carbonate, lactose, corn starch or animal and vegetable oils. Dosage unit forms to be chosen are, inter alia, tablets, hard gelatin capsules, powders and suspensions, the individual dosage unit being in the range of from about 3 to 200 mg/kg/day.

A special utility of the compounds of formula I is a combination with other active substances, especially with cardiac and circulatory agents, antidiabetics, further hypolipemic agents, psychopharmaceutics and vitamins.

The following Examples illustrate the invention, the structures of the compounds disclosed resulting from the elementary analysis and from data obtained by infrared and NMR spectroscopy.

EXAMPLE A

N-phenyl-carbamic acid-[imidazolyl-(1)-methyl]ester

According to method (a)

68.1 g (1 mol) of imidazole and 33.0 g (1.1 mols) of paraformaldehyde were intimately mixed and after addition of 0.5 ml of triethylamine the mixture was slowly heated while stirring to about 80°C, whereupon the reaction yielded a limpid melt which was cooled and dissolved in 500 ml of chloroform. To this solution, 119.1 g (1 mol) of phenylisocyanate in 200 ml of chloroform were added dropwise while stirring. While the temperature rose to about 55°C, the reaction product began to precipitate. After addition of the isocyanate which was advantageously completed after 10 to 15 minutes, the mixture was refluxed for another 30 minutes, cooled and suction-filtered. Redissolution and precipitation of the product from ethyl acetate did not improve the melting point.

Yield: 181 g (83 % of the theoretical yield), m.p. 165°–166°C (decomposition)

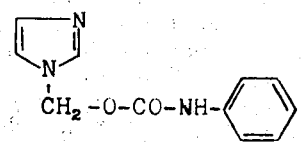

$C_{11}H_{11}N_3O_2$ molecular weight 217.2: Calculated: C, 60.8 %; H, 5.1 %; N, 19.34 %. Found: C, 60.8 %; H, 5.0 %; N, 19.6 %.

According to Method (b)

19.8 g (0.2 mol) of phosgene were dissolved in 100 ml of benzene and, at 5°–10°C, 37.2 g (0.4 mol) of aniline were added dropwise. Stirring was continued for 30 minutes while allowing the temperature to come to normal. The precipitated aniline hydrochloride was then suction-filtered and a solution of 0.2 mol of 1-hydroxy-methyl-imidazole (prepared from 13.6 g (0.2 mol) of imidazole, 6.6 g (0.22 mol) of paraformaldehyde and 0.1 ml of triethylamine) in 100 ml of chloroform was added dropwise to the filtrate while stirring, whereupon the temperature rose to about 40°C. The mixture was then refluxed for half an hour, the solvent was distilled off in vacuo, the residue was dissolved in water with an addition of dilute hydrochloric acid and

TABLE V

Antipyretic activity on rats suffering from yeast-induced fever

| Composition | dose in mg/kg p.o. | initial value in °C | change in body temperature in °C after | | | |
|---|---|---|---|---|---|---|
| | | | 30 min | 60 min | 120 min | 240 min |
| A | 10 | 38.4 | −0.3 | −0.5 | −0.6 | −0.4 |
| | 30 | 38.3 | −0.5 | −0.7 | −0.9 | −0.8 |
| | 100 | 38.3 | −0.6 | −1.1 | −1.6 | −1.3 |
| phenyl-butazone | 30 | 38.3 | −0.2 | −0.6 | −1.1 | −1.2 |
| B | 80 | | | −0.6 | −0.7 | |
| | 160 | | | −1.1 | −1.3 | |
| E | 20 | 38.5 | 0 | −0.3 | −0.4 | −0.5 |
| | 80 | 38.4 | −0.3 | −0.6 | −0.9 | −1.1 |
| | 160 | 38.3 | −0.2 | −0.7 | −1.4 | −2.0 |
| o-acetyl-salicylic acid | 80 | 38.4 | −0.2 | −0.9 | −1.4 | −1.4 |
| control | — | 38.3 | 0 | 0 | 0 | 0 |

TABLE VI

Sedative properties

| Composition | change in percentage of motility of mice treated with 1-phenyl-2-methylamino-propane hydrochloride upon oral administration of 150 mg/kg | prolongation of anesthesia caused by hexobarbitural (in %) upon oral administration of 20 mg/kg |
|---|---|---|
| A | − 28+) | |
| B | − 25 | |
| C | − 14 | |
| D | −30 to −60 | 236 |
| E | −40 to −60 | |
| F | −30 to −60 | 182 |
| K | −30 to −40 | |

+)upon 100 mg/kg the carbamate was precipitated while stirring and cooling with dilute sodium hydroxide solution.

Yield: 14.8 g, m.p. 165°C (decomposition)

Analysis: Calculated: C, 60.8 %, H, 5.1 %; N, 19.34 %. Found: C, 60.6 %; H, 5.2 %; N, 19.5 %.

According to the above Example (Method a), the following compounds cited in the Table were prepared, the crude products of B and C being recrystallized from tetrahydrofuran, K from ethyl acetate, D to H from ethyl acetate/petrol ether and I from dioxan.

TABLE

| Example | Compound | structural formula empirical formula | molecular weight | m.p. °C (decomp.) | yield | analysis calc. | | analysis found |
|---|---|---|---|---|---|---|---|---|
| B | N-(4-chlorophenyl)-carbamic acid [imidazolyl-(1)-methyl]-ester | $C_{11}H_{10}ClN_3O_2$ | 251.7 | 176 | 84 % | 52.5<br>4.0<br>14.1<br>14.7 | C<br>H<br>Cl<br>N | 52.4<br>4.2<br>14.3<br>16.7 |
| C | N-(3,4-dichlorophenyl)-carbamic acid [imidazolyl-(1)-methyl]-ester | $C_{11}H_9Cl_2N_3O_2$ | 285.1 | 181–182 | 83 % | 46.2<br>3.2<br>24.8<br>1.67 | C<br>H<br>Cl<br>N | 46.0<br>3.2<br>24.6<br>15.0 |
| D | N-[3-(1,2,2,2-tetrafluoroethoxy)-phenyl]-carbamic acid [imidazolyl-(1)-methyl]-ester | $C_{13}H_{11}F_4N_3O_3$ | 333.3 | 135 | 68 % | 46.9<br>3.3<br>22.8<br>12.6 | C<br>H<br>F<br>N | 47.0<br>3.3<br>23.1<br>13.0 |
| E | N-(3-trifluoromethyl-phenyl)-carbamic acid [imidazolyl-(1)-methyl]-ester | $C_{12}H_{10}F_3N_3O_2$ | 285.2 | 158 | 61% | 50.5<br>3.5<br>20.0<br>14.7 | C<br>H<br>F<br>N | 50.2<br>3.5<br>19.8<br>14.4 |
| F | N-(p-tolyl)-carbamic acid-[imidazolyl-(1)-methyl]-ester | $C_{12}H_{13}N_3O_2$ | 231.5 | 157 | 78 % | 62.3<br>5.7<br>18.15 | C<br>H<br>N | 62.3<br>5.5<br>17.9 |
| G | N-(4-methoxy-phenyl)-carbamic acid [imidazolyl-(1)-methyl]-ester | $C_{12}H_{13}N_3O_3$ | 247.3 | 164 | 82 % | 58.3<br>5.3<br>17.0 | C<br>H<br>N | 58.5<br>5.3<br>16.8 |
| H | N-[3,5-bis-(trifluoromethyl)-phenyl]-carbamic acid-[imidazolyl-(1)-methyl]ester | $C_{13}H_9F_6N_3O_2$ | 353.2 | 156 | 79 % | 44.2<br>2.6<br>32.3<br>11.9 | C<br>H<br>F<br>N | 44.3<br>2.8<br>32.0<br>11.7 |
| I | N-(4-nitrophenyl)-carbamic acid [imidazolyl-(1)-methyl]-ester | $C_{11}H_{10}N_4O_4$ | 262.2 | 184 | 74 % | 50.4<br>3.85<br>21.35 | C<br>H<br>N | 50.5<br>3.6<br>21.3 |
| K | N-(1-naphthyl)-carbamic acid [imidazolyl-(1)-methyl]-ester | $C_{15}H_{13}N_3O_2$ | 267.3 | 145 | 72 % | 67.4<br>4.9<br>15.7 | C<br>H<br>N | 67.3<br>5.0<br>15.8 |

EXAMPLE L

N-phenyl-carbamic acid-[benzimidazolyl-(1)-methyl]ester 35.4 g (0.3 mol) of benzimidazole were triturated with 9.9 g (0.33 mol) of paraformaldehyde, 0.5 to 1.0 ml of triethylamine was added and the mixture was slowly heated while stirring. At a temperature of from 100° to 120°C, a limpid melt was obtained which was cooled and mixed with 150 ml of chloroform. Subsequently, 35.7 g (0.3 mol) of phenyl-isocyanate diluted with 45 ml of chloroform were added thereto dropwise, the mixture was refluxed for 15 minutes, stirring was continued for 5 hours at room temperature and the whole was allowed to stand overnight. The suction-filtered product could be recrystallized from ethyl acetate.

Yield: 72 % of the theory, m.p. 193°–194°C (decomposition)

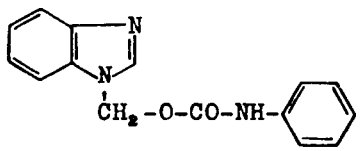

$C_{15}H_{13}N_3O_2$ molecular weight 267.3: Calculated: C, 67.4 %; H, 4.9 %; N, 15.7 %. Found: C, 67.4 %; H, 5.0 %; N, 15.7 %.

EXAMPLE M

N-(3-trifluoromethyl-phenyl)-carbamic acid-[benzimidazolyl-(1)-methyl]ester

Under the same conditions as disclosed in Example L, this ester was obtained using 3-trifluoromethyl-phenylisocyanate and it was dissolved and precipitated also from ethyl acetate.

Yield: 76 % of the theory, m.p. 189°–190°C (decomposition)

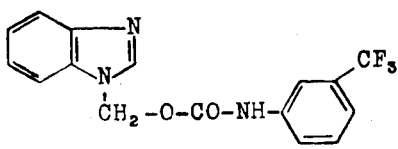

$C_{16}H_{12}F_3N_3O_2$ molecular weight 335.3: Calculated: C, 57.3 %; H, 3.6 %; F, 17.0 %; N, 12.5 %. Found: C, 57.1 %; H, 3.3 %; F, 16.9 %; N, 12.6 %.

What is claimed is:
1. A compound of the formula

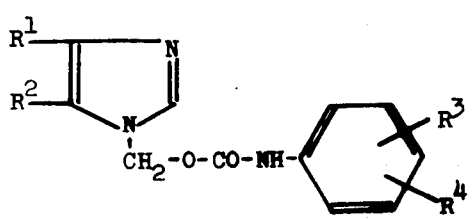

or a physiologically acceptable acid addition salt thereof, wherein $R^1$ and $R^2$, taken alone, are hydrogen, and $R^1$ and $R^2$ taken together are —CH=λ CH—CH=CH— which may be substituted with one or more halogen atoms, $NO_2$-groups, or lower alkyl, halogenolower alkyl, or lower alkoxy groups each having 1 to 4 carbon atoms in the alkyl portion thereof; and $R^3$ and $R^4$, taken alone, are hydrogen, halogen, nitro, or lower alkyl, halogeno-lower alkyl, lower alkoxy, or halogeno-lower alkoxy each having 1 to 4 carbon atoms in the alkyl portion thereof, and $R^3$ and $R^4$, taken together, are —CH=CH—CH=CH—, forming a naphthyl group of the formula

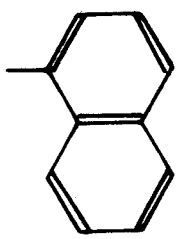 or 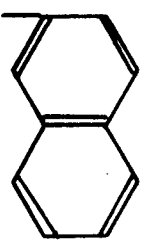

with the benzene ring to which they are attached.

2. N-Phenyl-carbamic acid-[imidazolyl-(1)-methyl]ester
3. N-(4-chlorophenyl)-carbamic acid-[imidazolyl-(1)-methyl]ester.
4. N-(3,4-dichlorophenyl)-carbamic acid-[imidazolyl-(1)-methyl]ester.
5. N-[3-(1,1,2,2-tetrafluoro-ethoxy)-phenyl]-carbamic acid-[imidazolyl-(1)-methyl]ester
6. N-(3-trifluoromethyl-phenyl)-carbamic acid-[imidazolyl-(1)-methyl]ester
7. N-(p-tolyl)-carbamic acid-[imidazolyl-(1)-methyl]ester
8. N-(4-methoxy-phenyl)-carbamic acid-[imidazolyl-(1)-methyl]ester
9. N-[3,5-bis-(trifluoromethyl)-phenyl]-carbamic acid-[imidazolyl-(1)-methyl]ester
10. N-(4-nitrophenyl)-carbamic acid-[imidazolyl-(1)-methyl]ester
11. N-(1-naphthyl)-carbamic acid-[imidazolyl-(1)-methyl]ester
12. N-phenyl-carbamic acid-[benzimidazolyl-(1)-methyl]ester
13. N-(3-trifluoromethyl-phenyl)-carbamic acid-[benzimidazolyl-(1)-methyl]ester
14. A method for making a hydrohalide of a compound as in claim 1 which comprises hydroxymethylating an imidazole or benzimidazole of the formula

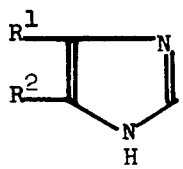

in the 1-position with a member selected from the group consisting of formaldehyde, trioxane, and paraformaldehyde to obtain the corresponding methylol compound of the formula

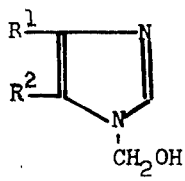

and then reacting said methylol compound with a member selected from the group consisting of isocyanates of the formula

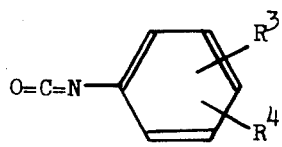

and carbamic acid halides of the formula

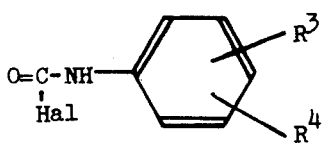

wherein Hal is halogen and R¹, R², R³, and R⁴ have their earlier meanings, to form said desired hydrohalide.

15. A method as in claim 14 wherein said hydrohalide is neutralized to form the corresponding free base.

16. A method as in claim 15 wherein said compound is salified with a physiologically acceptable acid.

17. A method for making a compound as in claim 1 which comprises hydroxymethylating an imidazole or benzimidazole of the formula

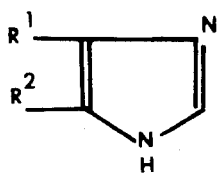

in the 1-position with a number selected from the group consisting of formal-dehyde, trioxane, and paraformaldehyde to obtain the corresponding methylol compound of the formula

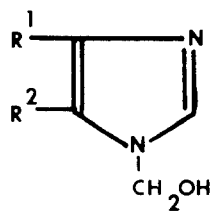

and then reacting said methylol compound with an isocyanate of the formula

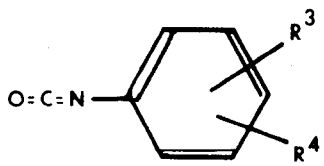

wherein R¹, R², R³, and R⁴ have their earlier meanings, to form said desired compound.

18. A method for making a hydrohalide of a compound as in claim 1 which comprises hydroxymethylating an imidazole or benzimidazole of the formula

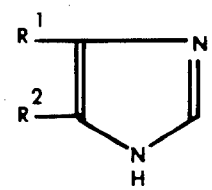

in the 1-position with a member selected from the group consisting of formaldehyde, trioxane, and paraformaldehyde to obtain the corresponding methylol compound of the formula

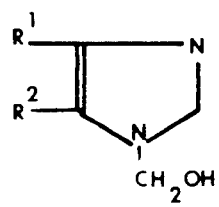

and then reacting said methylol compound with a carbamic acid halide of the formula

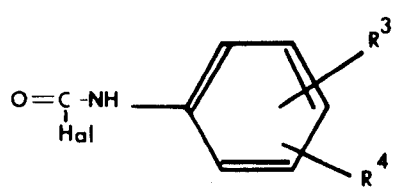

wherein Hal is halogen and R¹, R², R³, and R⁴ have their earlier meanings, to form said desired hydrohalide.

* * * * *